(12) United States Patent
Xie et al.

(10) Patent No.: US 12,367,193 B2
(45) Date of Patent: Jul. 22, 2025

(54) DATA QUERY APPARATUS, METHOD AND STORAGE MEDIUM

(71) Applicant: ZILLIZ INC., San Francisco, CA (US)

(72) Inventors: Chao Xie, San Francisco, CA (US); Jie Hou, Shanghai (CN); Rentong Guo, Shanghai (CN)

(73) Assignee: ZILLIZ INC., San Francisco, CA (US)

( * ) Notice: Subject to any disclaimer, the term of this patent is extended or adjusted under 35 U.S.C. 154(b) by 51 days.

(21) Appl. No.: 18/054,323

(22) Filed: Nov. 10, 2022

(65) Prior Publication Data

US 2024/0160628 A1 May 16, 2024

(51) Int. Cl.
G06F 16/2453 (2019.01)
G06F 11/34 (2006.01)
G06F 16/2455 (2019.01)

(52) U.S. Cl.
CPC .... *G06F 16/24542* (2019.01); *G06F 11/3409* (2013.01); *G06F 16/24561* (2019.01)

(58) Field of Classification Search
None
See application file for complete search history.

(56) References Cited

U.S. PATENT DOCUMENTS

| | | | |
|---|---|---|---|
| 8,676,729 B1 | 3/2014 | Keralapura et al. | |
| 11,360,982 B1 | 6/2022 | Liu et al. | |
| 11,392,596 B2 | 7/2022 | Wu et al. | |
| 2007/0276802 A1* | 11/2007 | Piedmonte | G06F 16/24542 |
| 2017/0091269 A1* | 3/2017 | Zhu | G06F 16/258 |
| 2017/0213257 A1* | 7/2017 | Murugesan | G06Q 30/0275 |
| 2019/0026336 A1* | 1/2019 | Tian | G06F 16/2455 |
| 2020/0065412 A1 | 2/2020 | Braundmeier | |
| 2021/0035020 A1* | 2/2021 | Boulineau | G06F 16/27 |
| 2022/0036123 A1* | 2/2022 | Cummings | G06N 20/00 |

(Continued)

FOREIGN PATENT DOCUMENTS

| | | |
|---|---|---|
| CN | 112905595 A | 6/2021 |
| CN | 113449132 B | 2/2022 |

(Continued)

OTHER PUBLICATIONS

Marcus et al. "Plan-Structured Deep Neural Network Models for Query Performance Prediction", 2019, https://www.vidb.org/pvldb/vol12/p1733-marcus.pdf (Year: 2019).

(Continued)

*Primary Examiner* — Tony Mahmoudi
*Assistant Examiner* — Umar Mian
(74) *Attorney, Agent, or Firm* — Kim IP Law Group LLC

(57) ABSTRACT

A data query apparatus, method, and storage medium include a database system that determines a data collection and a calculating model corresponding to a received query task request, according to the number of bytes occupied when the data collection or the calculating model is stored, or the number of bit widths occupied when the data collection or the calculating model is transmitted, the database system determines a transmission rate of the data collection or the calculating model. The query task request is transmitted to a model node or a data node with a lower transmission rate, and the data node or the model node with a higher transmission rate is dispatched to perform data calculation.

12 Claims, 7 Drawing Sheets

(56) References Cited

U.S. PATENT DOCUMENTS

2023/0147068 A1\* 5/2023 Rao ................ G06F 16/24547
707/719
2023/0409889 A1\* 12/2023 Haykal ................ G06N 3/063

FOREIGN PATENT DOCUMENTS

CN 114329094 A 4/2022
WO 2022177150 A1 8/2022

OTHER PUBLICATIONS

Tao et al. "Query-level loss functions for information retrieval", Mar. 2008, https://www.sciencedirect.com/science/article/pii/S0306457307001276 (Year: 2008).
Sun et al. "Learned Cardinality Estimation for Similarity Qeries", Jun. 25, 2021, https://dl.acm.org/doi/pdf/10.1145/3448016.3452790 (Year: 2021).
Yang et al. "Deep Unsupervised Cardinality Estimation", 2019, https://vldb.org/pvldb/vol13/p279-yang.pdf (Year: 2019).
Zheng et al. "Learned Probing Cardinality Estimation for High-Dimensional Approximate NN Search", 2023, https://ieeexplore.ieee.org/stamp/stamp.jsp?arnumber=10184837 &tag= 1 (Year: 2023).
Conglong Li, Improving Approximate Nearest Neighbor Search through Learned Adaptive Early Termination, Research 29: Data Mining and Similarity Search, Jun. 14-19, 2020, p. 2539-2554, Portland, OR.
United States Patent and Trademark Office, Office Action issued in related U.S. Appl. No. 17/931,671 dated Aug. 9, 2024.
United States Patent and Trademark Office, Office Action issued in related U.S. Appl. No. 18/062,408 dated Sep. 5, 2024.
United States Patent and Trademark Office, Office Action issued in related U.S. Appl. No. 18/062,408 dated Jul. 11, 2024.
United States Patent and Trademark Office, Office Action issued in related U.S. Appl. No. 18/062,408 dated Dec. 24, 2024.
United States Patent and Trademark Office, Office Action issued in related U.S. Appl. No. 17/931,671 dated Dec. 4, 2024.

\* cited by examiner

DATA QUERY APPARATUS, METHOD AND STORAGE MEDIUM

TECHNICAL FIELD

The disclosure relates in general to the field of data processing, and more particularly, to a data query apparatus, method, and storage medium.

BACKGROUND

With the development of artificial intelligence technology, the application of machine learning models in daily life has become more and more widespread. As such, database systems for storing data related to machine learning models, such as vector database systems for storing vectors, are also becoming more and more widespread. Machine learning models can be configured to address tasks such as database system classification, detection, query, etc.

When the database system receives the query task request, it is necessary to transmit the dispatched data collection to the node storing the calculating model through the network for task calculation. When the data being collected is large, the dispatching of the data will increase the pressure of network data transmission, thereby decreasing the processing efficiency of the database system handling the task, and slowing the query speed.

SUMMARY

The following examples pertain to embodiments described throughout this disclosure.

One or more embodiments can include an apparatus including a storage device configured to store one or more data collections and one or more calculating models. The one or more data collections are stored in a first node device in the storage device and the one or more calculating models are stored in a second node device in the storage device. The apparatus can include a processor configured to receive a query task request; determine a data collection from the one or more data collections and a calculating model from the one or more calculating models corresponding to the query task request; and determine a dispatching condition of the query task request for performing dispatching of the data collection or the calculating model. The dispatching condition is configured to indicate a comparison result for a dispatching cost of the data collection and the calculating model. In response to the dispatching condition corresponding to a case in which the data collection is dispatched, the data collection is dispatched from the first node device to the second node device for executing a query task, and then a query result is returned. In response to the dispatching condition corresponding to a case in which the calculating model is dispatched, the calculating model is dispatched from the second node device to the first node device for executing the query task, and then the query result is returned.

One or more embodiments can include an apparatus where the comparison result for the dispatching cost comprises at least one of: the comparison result for the dispatching cost being determined based on a number of bytes utilized when the data collection and the calculating model are stored; and the comparison result for the dispatching cost being determined based on bit widths utilized when the data collection and the calculating model are dispatched for transmission.

One or more embodiments can include an apparatus where, when the data collection is dispatched, the comparison result for the dispatching cost corresponds to: the number of bytes utilized when the data collection is stored being less than the number of bytes utilized when the calculating model is stored; or the bit width utilized when the data collection is dispatched for transmission being less than the bit width utilized when the calculating model is dispatched for transmission.

One or more embodiments can include an apparatus where, when the calculating model is dispatched, the comparison result for the dispatching cost corresponds to: the number of bytes utilized when the data collection is stored being greater than the number of bytes utilized when the calculating model is stored; or the bit width utilized when the data collection is dispatched for transmission being greater than the bit width utilized when the calculating model is dispatched for transmission.

One or more embodiments can include an apparatus where receiving the query task request includes parsing the query task request to generate a parsed result; constructing a topology diagram according to the parsed result; wherein the topology diagram is configured to indicate execution logic of the query task request; generating an execution plan based on the execution logic; and returning the query result after executing the query task based on the execution plan.

One or more embodiments can include an apparatus where parsing the query task request and constructing the topology diagram according to the parsed result includes obtaining a host language of the query task request, wherein the host language is configured to represent a computer language for writing query codes comprising the query task request; parsing the query codes to obtain a plurality of logical nodes and an association of each of the plurality of logical nodes, wherein the association is configured to represent the exchange of data for each of the logical nodes; and connecting each of the plurality of logical nodes based on the association to obtain the topology diagram.

One or more embodiments can include an apparatus where the topology diagram comprises a directed acyclic graph.

One or more embodiments can include an apparatus where the execution plan comprises a binary executable file.

One or more embodiments can include an apparatus where the computer language comprises at least one of C, C++, Java, Scala, Python, Perl, Go, R and Lisp.

One or more embodiments can include a method executed by at least one processor. The method includes receiving a query task request; determining a data collection and a calculating model corresponding to the query task request; and determining a dispatching condition of the query task request for performing dispatching of the data collection or the calculating model. The dispatching condition is configured to indicate a comparison result for a dispatching cost of the data collection and the calculating model. In response to the dispatching condition corresponding to a case in which the data collection is dispatched, the data collection is dispatched from the first node device to the second node device for executing a query task, and then a query result is returned. In response to the dispatching condition corresponding to a case in which the calculating model is dispatched, the calculating model is dispatched from the second node device to the first node device for executing the query task, and then the query result is returned.

One or more embodiments can include a method where the comparison result for the dispatching cost comprises at least one of: the comparison result for the dispatching cost being determined based on a number of bytes utilized when the data collection and the calculating model are stored; and the comparison result for the dispatching cost being determined based on bit widths utilized when the data collection and the calculating model are dispatched for transmission.

One or more embodiments can include a method where, when the data collection is dispatched, the comparison result for the dispatching cost corresponds to: the number of bytes utilized when the data collection is stored being less than the number of bytes utilized when the calculating model is stored; or the bit width utilized when the data collection is dispatched for transmission being less than the bit width utilized when the calculating model is dispatched for transmission.

One or more embodiments can include a method where, when the calculating model is dispatched, the comparison result for the dispatching cost corresponds to: the number of bytes utilized when the data collection is stored being greater than the number of bytes utilized when the calculating model is stored; or the bit width utilized when the data collection is dispatched for transmission being greater than the bit width utilized when the calculating model is dispatched for transmission.

One or more embodiments can include a method where receiving the query task request includes parsing the query task request to generate a parsed result; constructing a topology diagram according to the parsed result; wherein the topology diagram is configured to indicate execution logic of the query task request; generating an execution plan based on the execution logic; and returning the query result after executing the query task based on the execution plan.

One or more embodiments can include a method where parsing the query task request and constructing the topology diagram according to the parsed result includes obtaining a host language of the query task request, wherein the host language is configured to represent a computer language for writing query codes comprising the query task request; parsing the query codes to obtain a plurality of logical nodes and an association of each of the plurality of logical nodes, wherein the association is configured to represent the exchange of data for each of the logical nodes; and connecting each of the plurality of logical nodes based on the association to obtain the topology diagram.

One or more embodiments can include a computer-readable storage medium storing instructions that, when executed, cause an electronic device to perform a method. The method includes receiving a query task request; determining a data collection and a calculating model corresponding to the query task request; and determining a dispatching condition of the query task request for performing dispatching of the data collection or the calculating model. The dispatching condition is configured to indicate a comparison result for a dispatching cost of the data collection and the calculating model. In response to the dispatching condition corresponding to a case in which the data collection is dispatched, the data collection is dispatched from the first node device to the second node device for executing a query task, and then a query result is returned. In response to the dispatching condition corresponding to a case in which the calculating model is dispatched, the calculating model is dispatched from the second node device to the first node device for executing the query task, and then the query result is returned.

One or more embodiments can include a computer-readable storage medium where the comparison result for the dispatching cost comprises at least one of: the comparison result for the dispatching cost being determined based on a number of bytes utilized when the data collection and the calculating model are stored; and the comparison result for the dispatching cost being determined based on bit widths utilized when the data collection and the calculating model are dispatched for transmission.

One or more embodiments can include a computer-readable storage medium where: when the data collection is dispatched, the comparison result for the dispatching cost corresponds to: the number of bytes utilized when the data collection is stored being less than the number of bytes utilized when the calculating model is stored, or the bit width utilized when the data collection is dispatched for transmission being less than the bit width utilized when the calculating model is dispatched for transmission; and when the calculating model is dispatched, the comparison result for the dispatching cost corresponds to: the number of bytes utilized when the data collection is stored being greater than the number of bytes utilized when the calculating model is stored, or the bit width utilized when the data collection is dispatched for transmission being greater than the bit width utilized when the calculating model is dispatched for transmission.

One or more embodiments can include a computer-readable storage medium where receiving the query task request includes parsing the query task request to generate a parsed result; constructing a topology diagram according to the parsed result; wherein the topology diagram is configured to indicate execution logic of the query task request; generating an execution plan based on the execution logic; and returning the query result after executing the query task based on the execution plan.

One or more embodiments can include a computer-readable storage medium where parsing the query task request and constructing the topology diagram according to the parsed result includes obtaining a host language of the query task request, wherein the host language is configured to represent a computer language for writing query codes comprising the query task request; parsing the query codes to obtain a plurality of logical nodes and an association of each of the plurality of logical nodes, wherein the association is configured to represent the exchange of data for each of the logical nodes; and connecting each of the plurality of logical nodes based on the association to obtain the topology diagram.

BRIEF DESCRIPTION OF THE FIGURES

The foregoing summary, as well as the following detailed description of the exemplary embodiments, will be better understood when read in conjunction with the appended drawings. For the purpose of illustrating the present disclosure, there are shown in the drawings embodiments, which are presently preferred. It will be understood, however, that the present disclosure is not limited to the precise arrangements and instrumentalities shown.

In the drawings.

DETAILED DESCRIPTION

Figure 1:
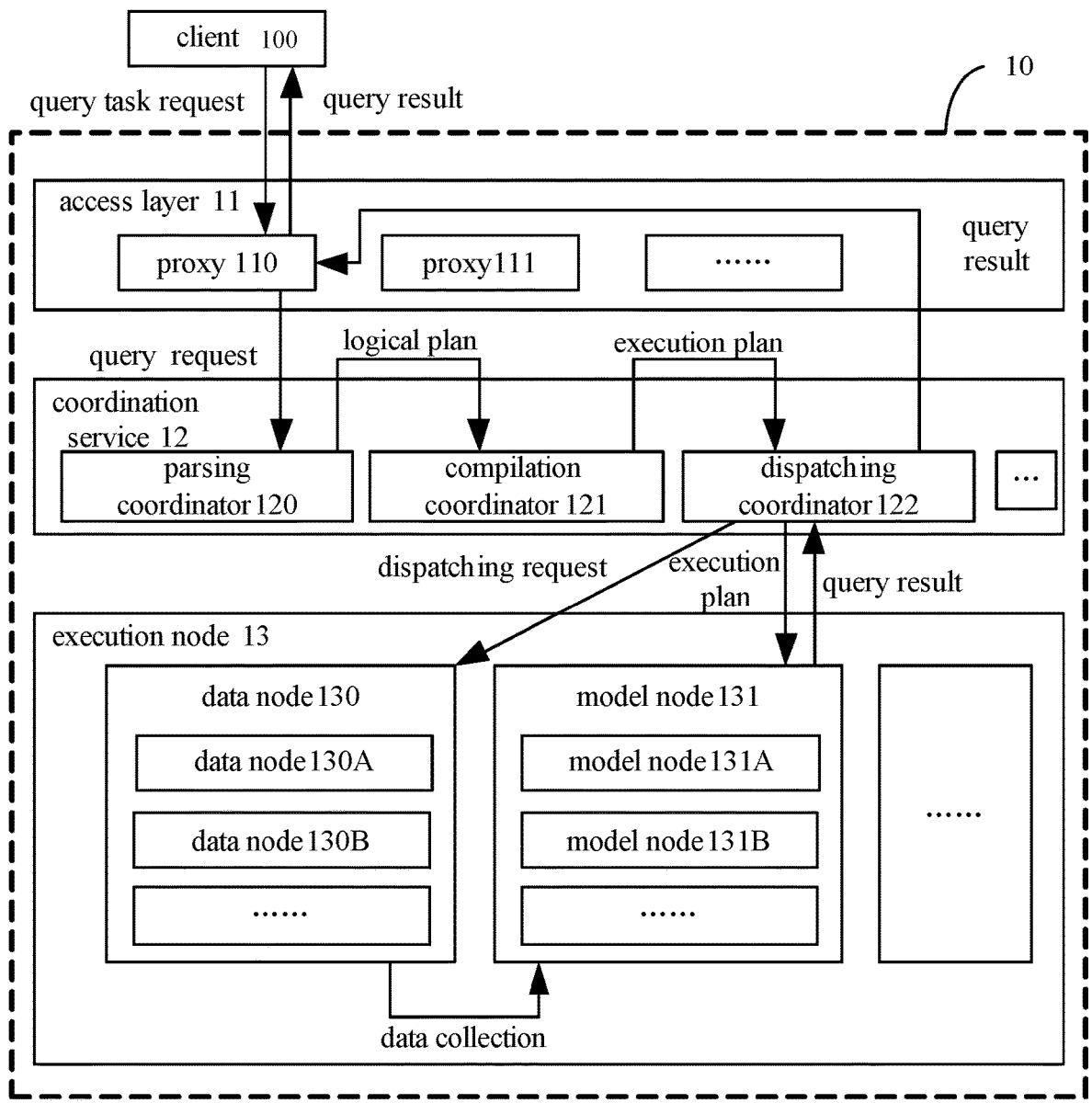
FIG. 1 illustrates a schematic structural diagram of a database system 10 according to some embodiments of the present disclosure.

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout this disclosure, various aspects of the subject disclosure can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure can be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages can be recognized in certain embodiments that can not be present in all exemplary embodiments of the subject disclosure.

FIG. 1 illustrates a schematic structural diagram of a database system 10 according to some embodiments of the present disclosure. While FIG. 1 illustrates various components contained in the database system 10, FIG. 1 illustrates one example of a database system of the present disclosure, and additional components can be added and existing components can be removed.

As shown in FIG. 1, the database system includes an access layer 11, a coordination service 12, and an execution node 13. The access layer 11 includes a plurality of proxies, such as a proxy 110, a proxy 111, etc. The access layer 11 includes an interface configured to externally provide a user connection, such as an Application Program Interface (API) of the database system 10, configured to receive a query task request of a user, return a query result to the user, etc., such as receiving a query task request of the client 100, returning a query result to the client 100, etc.

The coordination service 12 can assign tasks to the execution nodes 13. The task can include, but not limited to, cluster topology node management, load balancing, time stamp generation, data declaration, data management, etc. In some embodiments, the coordination service 12 may include a parsing coordinator 120, configured to parse a received host language and generate a logical plan of the topology by the parsed result.

In embodiments, the host language can be configured to indicate a processing language based on a user-initiated execution event, which may be a query task request initiated by the client 100. The type of processing language configured to execute the event can be determined according to the operating system of the client 100, for example, when the iOS® system corresponds to a host environment for C language, the host language corresponding to the iOS® system is the C language; when the Android ° system corresponds to a host environment for Java language or the like, the host language corresponding to the Android ° system is the Java language or the like. In other embodiments, the host language may further include, but not limited to, C++, Scala, Python, Perl, Go, R, Lisp, etc. Topologies include, but not limited to, tree topologies, mesh topologies, etc.

A compilation coordinator 121 can be configured to convert a logical plan compilation of the host language into an execution plan of a binary executable file. For example, the Java language can be converted from a source code file compilation with the suffix .java to an executable file with the suffix .class. In another example, the C language may be converted from a source code file compilation with the suffix .c to an executable file with the suffix .exe, etc.

A dispatching coordinator 122 can be configured to determine a data collection and a calculating model corresponding to the execution plan. The dispatching coordinator 122 can be configured to transmit the execution plan and dispatch the data collection to the execution node 13 according to the node where the calculating model is located. An execution node 13 can be configured to execute the execution plan instructions issued by the coordination service 12. In some embodiments, the execution node 13 can include a data node 130 that includes a plurality of data nodes, such as a data node 130A, a data node 130B, etc. The plurality of data nodes can be configured to store data in a database system.

In embodiments, the data categories can be categorized by different data nodes, e.g., data node 130A configured to store the data of hot news category, data node 130B configured to store the data of shopping item category, etc. In embodiments, a data node can include a plurality of data collections of different subcategories of a data category, e.g., the data node 130B stores a data collection of footwear items, a data collection of packaged items, a data collection of electronic items, etc.

In embodiments, a model node 131 can include a plurality of model nodes, such as a model node 131A, a model node 131B, etc. The plurality of model nodes can be configured to store models in a database system.

In embodiments, the models can be categorized by data categories in data nodes corresponding to different model nodes, such as model node 131A being configured to store models for processing the data of hot news category, and model node 131B being configured to store models for processing the data of shopping item category. In embodiments, a model node can include a plurality of computational models corresponding to different data collections in the data categories, e.g., the model node 131B stores a plurality of calculating models corresponding to separately processing the data collections of footwear items, the data collections of package items, the data collections of electronic items, etc.

In embodiments, as shown in FIG. 1, during the task processing in which a user transmits a query task request to the database system 10 through the client 100, the user first receives the query task request transmitted by the client 100 through the proxy 110/111, and forwards the query task request to the parsing coordinator 120 to generate a logical plan, and the compilation coordinator 121 converts the logical plan into an execution plan. Then, after the dispatching coordinator 122 determines the calculating model and the data collection corresponding to the execution plan, the dispatching coordinator 122 transmits the execution plan to the model node where the calculating model is located, dispatches the data collection in the corresponding data node to the model node for data calculation, finally returns one or more sub-query results to the proxy 110/111, and then the proxy 110/111 aggregates the sub-query results to obtain the query results of the query task requests, and returns the query results to the user, for example, to the client 100.

It will be understood that the structure of the database system 10 shown in FIG. 1 is merely an example, and in other embodiments, the database system 10 may include more or fewer modules, or may combine or split parts of the modules, which are not limited herein. It will be understood that the modules in the database system 10 shown in FIG. 1 can be deployed in the same electronic device or in different electronic devices, which are not limited herein. Also, the database system 10 can be implemented as either a single electronic device or as a server cluster.

It will be understood that in some embodiments, the database system 10 can be a vector database. The feature vectors in various types of unstructured data (e.g., text, image, audio, video, DNA sequence, chemical formula, substance structure, etc.) stored in the database system can obtain results related/similar to the feature vectors of the search data or the search data according to the search data or the feature vectors of the search data provided by the user. The feature vectors can be configured in scenarios such as instantly returning pictures most similar to uploaded pictures from a mass database, retrieving similar videos or making real-time video recommendations according to video key frames, quickly retrieving audio data such as mass speech/music/sound effects, and returning similar audio, retrieving similar chemical molecular structures/superstructures/substructures, recommending related information or commodities according to user behaviors and requirements, automatically answering questions for the user, classifying genes by comparing the similar DNA sequences, and helping the user search required information from the text database through keywords.

It will be understood that the data query method provided in the embodiments of the present disclosure is applicable to a database system in which any data query operation exists. For ease of description, the technical solution of the embodiments of the present disclosure will be described below in connection with the structure of the database system 10 shown in FIG. 1.

As described above, after receiving the query task request, the database system generally dispatches the data collection requesting the query to the model node in which the calculating model is located for data calculation. When the data amount of the data collection is large, the transmission rate of the dispatched data collection is low, and the bit width is large, which increases the pressure of the network transmission, thereby decreasing the data query efficiency. To solve the above technical problem, the present disclosure provides a data query method applied to a database system. After determining a data collection and a calculating model corresponding to a received query task request, the database system first determines a transmission rate in a network when the data collection and the calculating model are dispatched, then the query task request is transmitted to a model node or a data node with a lower transmission rate, and the data node or the model node with a higher transmission rate is dispatched to perform data calculation, thereby improving the network transmission rate during dispatching, decreasing the occupation of bit widths during dispatching, and improving data query efficiency. For example, the transmission rate of the data collection or the calculating model may be determined by the number of bytes occupied when the data collection or the calculating model is stored. For example, the larger the number of bytes occupied, the lower the transmission rate; or for example, the transmission rate of the data collection or the calculating model may be determined by the bit width occupied when the data collection or the calculating model is transmitted. For example, the larger the bit width occupied, the lower the transmission rate. Therefore, the transmission rate during dispatching can be effectively improved, the occupation of bit widths during dispatching can be reduced, the executing and dispatching of other query tasks can be facilitated, and the data query efficiency can be improved.

Figure 2A:
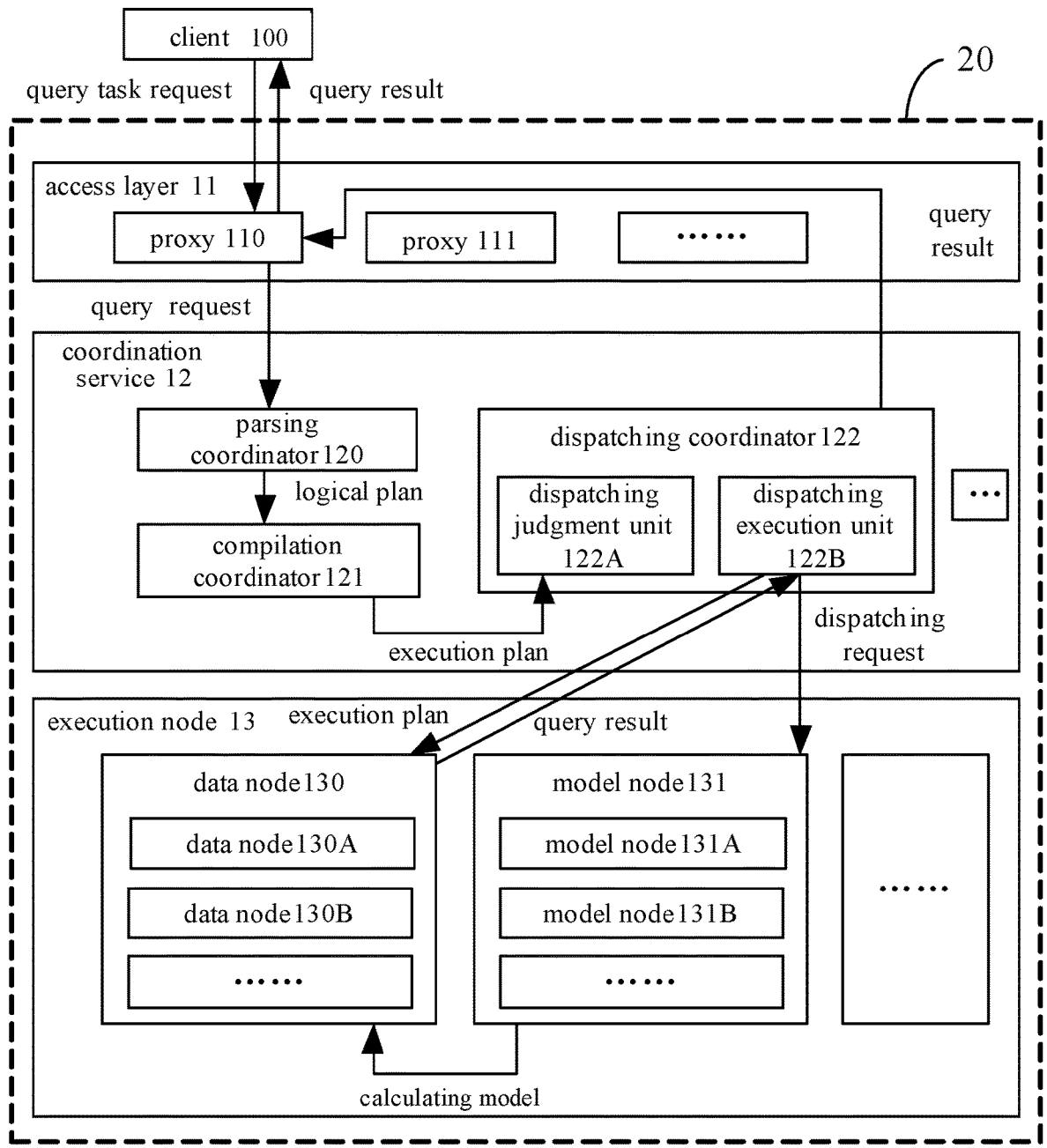
FIG. 2A illustrates a schematic structural diagram of a database system 20 according to some embodiments of the present disclosure.
Figure 2B:
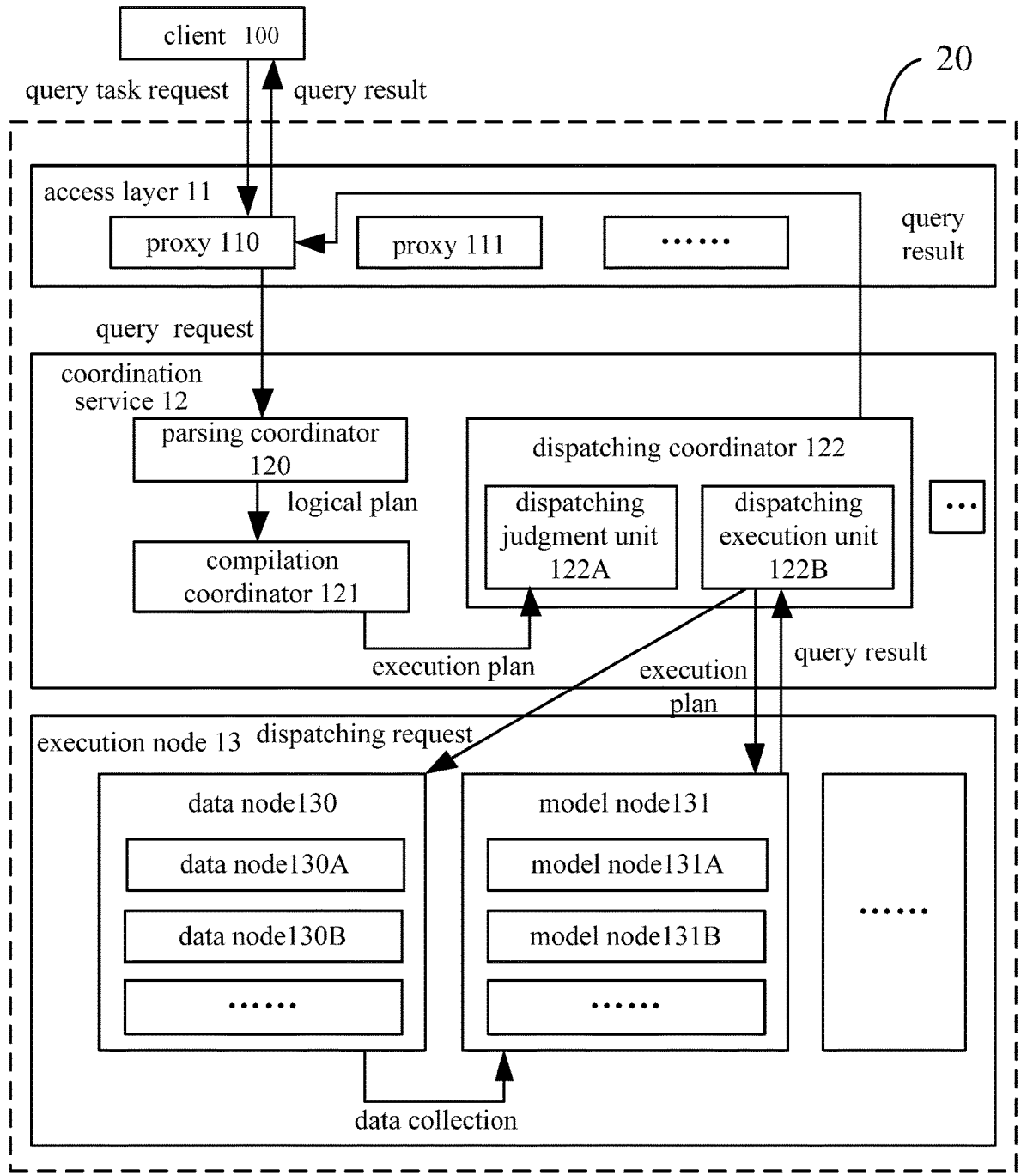
FIG. 2B illustrates a schematic structural diagram of another database system 20 according to some embodiments of the present disclosure.

FIGS. 2A and 2B illustrate a schematic structural diagram of a database system 20 according to some embodiments of the present disclosure. The structure of the database system 20 shown in FIGS. 2A and 2B is similar to the structure of the database system 10 shown in FIG. 1. Compared with the structure of the database system 10 shown in FIG. 1, the structure of the dispatching coordinator 122 in the database system 20 as shown in FIGS. 2A and 2B can be different. Therefore, the structure of the dispatching coordinator 122 in the database system 20 will be described in detail below. Description of other structures of the database system 20 can reference the description of the database system 10 as shown in FIG. 1.

In some embodiments, as shown in FIG. 2A or FIG. 2B, after receiving the query task request transmitted by the client 100, the database system 20 receives the query task request from the proxy 110 and forwards the query request to the parsing coordinator 120, and the parsing coordinator 120 parses the query request to generate a logical plan. After the compilation coordinator 121 converts the logical plan into an execution plan, the data collection and the calculating model corresponding to the execution plan are determined by the dispatching judgment unit 122A. For example, the data collection is stored in the data node 130A, and the calculating model is stored in the model node 131A. After the data collection is calculated by the calculating model, the calculated result is returned to the client 100 as a query result. The node in which the data calculation is performed may determine the transmission rate of the data collection and the calculating model by the dispatching judgment unit 122A. For example, if the transmission rate of the data collection is higher than the transmission rate of the calculating model, the data collection is dispatched from the data node 130A to the model node 131A, the model node 131A is configured as a node for data calculation, and the calculation result is returned by the model node 131A; if the transmission rate of the data collection is lower than the transmission rate of the calculating model, the calculating model is dispatched from the model node 131A to the data node 130A, the data node 130A is configured as a node for data calculation, and the calculation result is returned by the data node 130A.

In embodiments, as shown in FIG. 2A, when the corresponding dispatching judgment unit 122A judges that the transmission rate of the data collection is lower than the transmission rate of the calculating model, for example, if the size of the storage space occupied when the data collection is stored is 100 megabytes, the bytes occupied by the data collection is 104857600 bytes; if the size of the storage space occupied when the calculating model is stored is 50 megabytes, the bytes occupied when the calculating model is stored is 52428800 bytes, that is, the number of bytes occupied when the data collection is stored is greater than the number of bytes occupied when the calculating model is stored.

Further, the dispatching execution unit 122B transmits the execution plan to the data node in which the data collection is located, initiates a dispatching request to the model node in which the calculating model is located, dispatches the calculating model to the data node for data calculation, and sequentially returns the result calculated at the data node as a query result from the dispatching coordinator 122 and the proxy 110 to the client 100. Compared with the data collection in which the dispatching transmission rate is lower, the calculating model in which the dispatching transmission rate is higher can effectively improve the transmission rate during dispatching, decrease the occupation of bit widths during dispatching, facilitate the execution dispatching of other query tasks, and improve the data query efficiency.

In embodiments, as shown in FIG. 2B, when the corresponding dispatching judgment unit 122A judges that the transmission rate of the data collection is higher than the transmission rate of the calculating model, for example, if the size of the storage space occupied when the calculating model is stored is 100 megabytes, the bytes occupied by the calculating model is 104857600 bytes; if the size of the storage space occupied when the data collection is stored is 50 megabytes, the bytes occupied when the data collection is stored is 52428800 bytes, that is, the number of bytes occupied when the data collection is stored is less than the number of bytes occupied when the calculating model is stored.

Further, the dispatching execution unit 122B transmits the execution plan to the model node in which the calculating model is located, initiates a dispatching request to the data node in which the data collection is located, dispatches the data collection to the model node for data calculation, and sequentially returns the result calculated at the model node to the client 100 from the dispatching coordinator 122 and the proxy 110 as a query result. Compared with the calculating model in which the dispatching transmission rate is lower, the dispatching of the data collection in which the transmission rate is higher can effectively improve the transmission rate during dispatching, decrease the occupation of bit widths during dispatching, facilitate the execution dispatching of other query tasks, and improve the data query efficiency. By first judging the transmission rate during data and model dispatching in the data or model dispatching process, the data or model with the higher transmission rate is dispatched to the node where the model or data with the lower transmission rate is located for data calculation, so that the network bit width occupied by network transmission during dispatching can be decreased, and data query efficiency and user experience can be improved.

Some embodiments of the present disclosure are illustrated below in connection with the database system 20 shown in FIGS. 2A and 2B.

Figure 3:
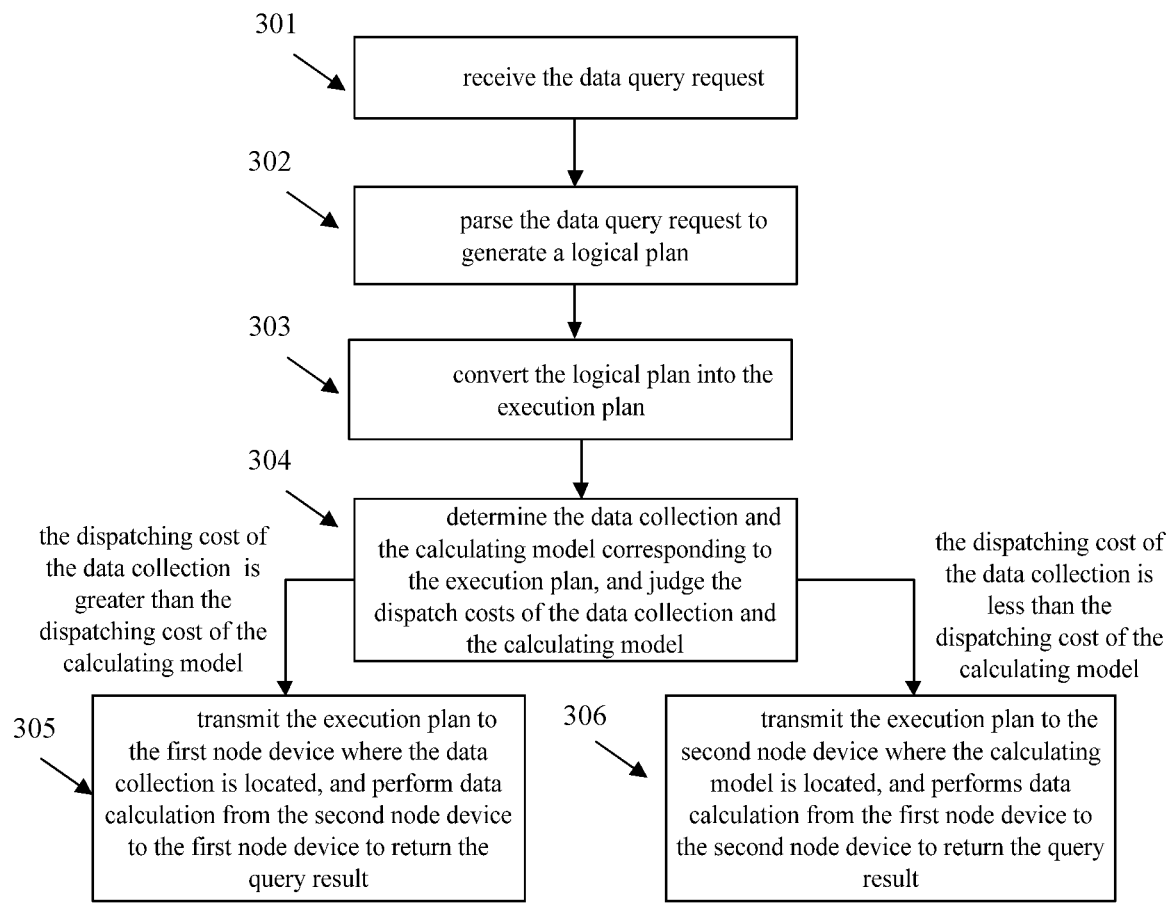
FIG. 3 illustrates a flow chart of a data query method according to some embodiments of the present disclosure.

FIG. 3 illustrates a flow chart of a data query method according to some embodiments of the present disclosure. While FIG. 3 shows various stages or steps that can be performed, additional stages or steps can be added and existing stages or steps can be reordered and/or removed.

As shown in FIG. 3, in 301, the proxy 110 receives the query task request transmitted by the client 100. In embodiments, the user can initiate a query task request through the client 100 to the database system 20, which receives the query task request through the proxy 110 and forwards the query request to the parsing coordinator 120. For example, a user can initiate a query task request to the database system 20 via a client 100 such as a mobile phone, a tablet computer, a notebook computer, a desktop computer, etc. For instance, the user can initiate a data query related to the user ID to the database system 20 by inputting the user ID. The data information related to the user ID can be data information related to the user basic information corresponding to the user ID. The user basic information can include, but is not limited to, a user's name, age, sex, habitual residence, historical shopping record, etc. The data information related to the user ID may be different types of data information based on hot news in a region in which the user's habitual residence is located, or based on interest video in an area in which the user's age is located, or based on commodity recommendation of the user's historical shopping record, etc., the present disclosure is not limited herein.

In embodiments, when a user initiates a query task request to the database system 20 by inputting a user ID through the client 100, the client 100 can first acquire user basic information corresponding to the user ID according to the user ID and can determine the data information type to be queried by the user based on the user basic information. Then, the client 100 generates the query task request and transmits the query task request to the database system 20 for executing the query task. In embodiments, the client 100 can query the value or the like of the corresponding user basic information in the key-value database by using the user ID as the key.

In embodiments, after the user inputs the user ID, the hot news of the area in which the user usually resides and the commodity recommended data information of the user historical shopping record are exemplified as the data information type of the query task request of the present disclosure. The specific data information type may also include more types, and the present disclosure is not limited herein.

In 302, the parsing coordinator 120 parses the query task request to generate a logical plan. In embodiments, the parsing coordinator 120 logically parses the host language corresponding to the query task request, extracts the execution logic of the execution event corresponding to the host language, and generates the execution logic into a logical plan of the tree topology. For example, a logic plan may be generated by a Directed Acyclic Graph (DAG), each operator is represented by each node in the DAG, and a nested query is implemented according to a connection relationship between each operator.

Figure 4:
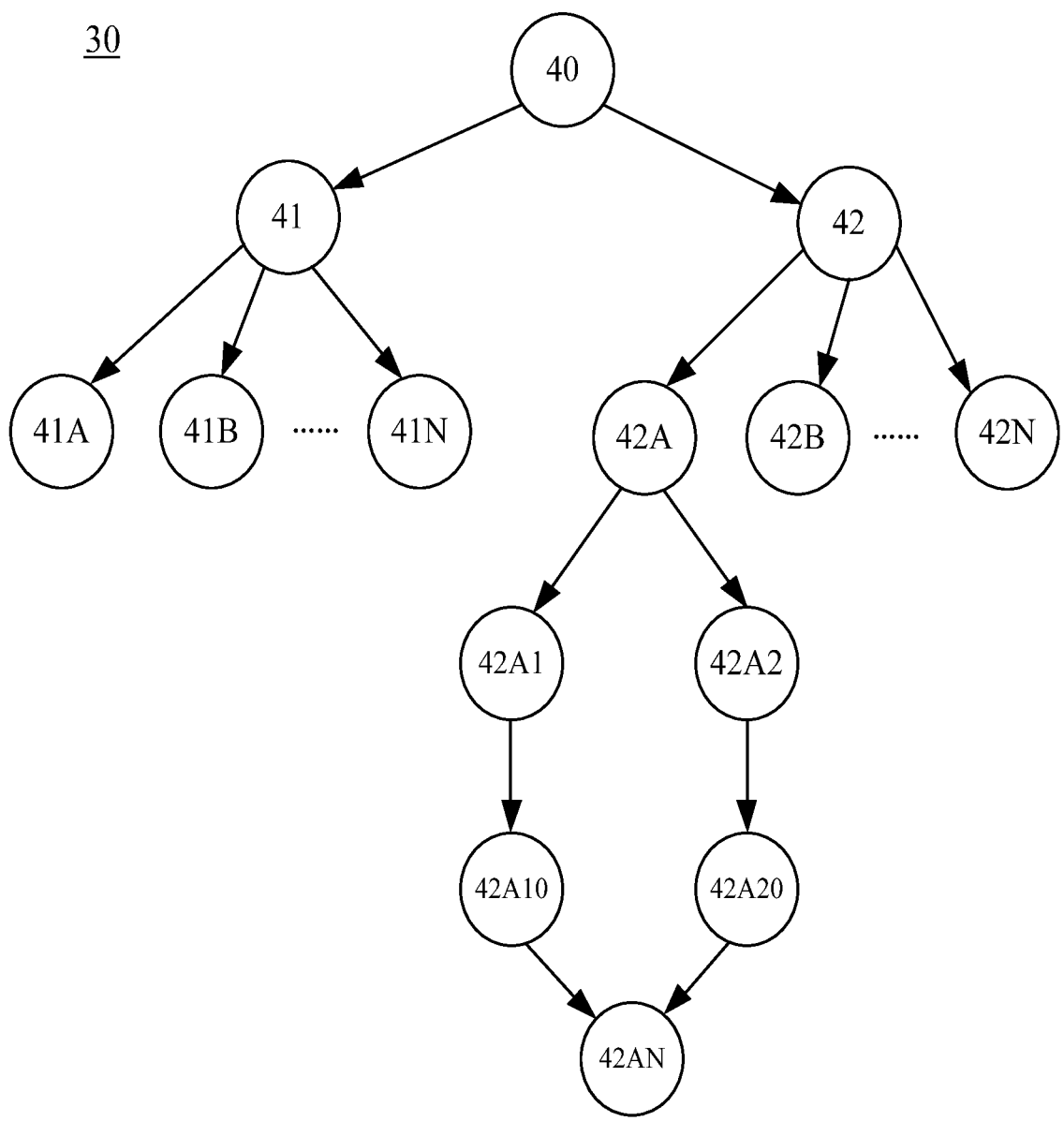
FIG. 4 illustrates a schematic structural diagram of a DAG 30 according to some embodiments of the present disclosure.

FIG. 4 illustrates a schematic structural diagram of a DAG 30 according to some embodiments of the present disclosure. As shown in FIG. 4, the node 40 is configured to represent the user ID inputted, and the node 41 is configured to represent the user basic information of the user's habitual residence acquired according to the user ID. The node 41A-N can be configured to represent hot news inquired according to a region in which the user usually lives. The node 41A-N can be configured to represent different types of hot news, such as entertainment news, weather news, fitness news, etc. The node 42 is configured to represent the user basic information of the user historical shopping record acquired according to the user ID. The node 42A-N can be configured to represent the recommended items queried according to the user historical shopping record. The node 42A-N can be configured to represent different types of recommended items, such as footwear items, package items, electronic items, etc.

In embodiments, a single piece of news or a single item of different types of hot news/recommended items can be weighted based on the user's historical browsing time, click frequency, search frequency, etc. of different hot news/recommended items, when the hot news or the recommended items are queried according to the area in which the user's habitual residence is located, or when the recommended items are queried according to the user's historical shopping, filtering out the hot news or the recommended items with a higher score so that the query results returned to the user are more appropriate to the user's needs. For example, as shown in FIG. 4, the node 42A can be configured to represent footwear recommended items. The node 41A1 can be configured to represent leather footwear recommended items; the node 41A2 is configured to represent cloth footwear recommended items, etc. The node 41A10 can be configured to represent leather footwear recommended items that are five percent earlier than the score ranking based on the weight score of each leather footwear, and the node 41A20 can be configured to represent cloth footwear recommended items that are three percent earlier than the score ranking based on the weight score of each cloth footwear.

It will be understood that the DAG is constructed by extracting the execution logic from the host language in the query task request, and the DAG classifies and collates the execution logic of each execution event in the query task request, thereby implementing nested query and improving the data query efficiency. For example, according to the structure diagram of the DAG shown in FIG. 4, when the host language is parsed, the query task request may be divided into a plurality of sub-query tasks (such as nodes 41 and 42) based on the acquired different user basic information. Then, each sub-query task may perform parallel query in the database system based on the query rules corresponding to each sub-query task, and the query logic of the sub-query task may be optimized by the DAG (e.g., first obtaining recommended items of footwear based on a user's historical shopping record, then obtaining a sub-category such as a leather shoe or a cloth shoe from the recommended items of footwear, and finally obtaining a query result after performing score filtering on the items based on a user's historical record such as a historical browsing time, a click frequency, a search frequency, etc.), thereby effectively improving the data query efficiency. It will be understood that the structure of the DAG 30 shown in FIG. 4 is merely an example, and in other embodiments, the DAG 30 may include more or fewer nodes, or may combine or split part of the nodes, which is not limited herein.

In 303, he compilation coordinator 121 converts the logical plan into the execution plan. In embodiments, the compilation coordinator 121 converts the logical plan compilation of the host language into an execution plan that is compiled and converted into a binary executable file. For example, the Java language can be converted from a source code file compilation with the suffix .java into an executable file with the suffix .class, and the C language may be converted from a source code file compilation with the suffix .c into an executable file with the suffix .exe, etc.

In 304, the dispatching judgment unit 122A determines the data collection and the calculating model corresponding to the execution plan, and judges the dispatching costs of the data collection and the calculating model. As an example, the dispatching judgment unit 122A can judge according to the size of the space storage of the data collection and the calculating model.

In embodiments, as shown in FIG. 2A or FIG. 2B, the dispatching judgment unit 122A determines the data collection and the calculating model corresponding to the execution plan by the execution plan. For example, the data collection of the query requested by the execution plan can include the data collection of the hot news queried according to the area where the user usually lives, and the data collection of the recommended items queried according to the user's historical shopping record, and also the calculating model for performing weight scoring, filtering on the data collection of the hot news or the recommended items, etc.

For example, as shown in FIG. 4, each type of hot news corresponding to the node 41A-N can be stored in each data collection in the data node 130A, and the calculating model of the data collection corresponding to each type of hot news is stored in the model node 131A. Each type of recommended items corresponding to the node 42A-N can be stored in each data collection of the data node 130B, and the calculating model corresponding to the data collection of each type of recommended items can be stored in the model node 131B.

It will be understood that after determining the data collection and the calculating model, the dispatching cost may be determined based on the determined data collection and the transmission rate at which the calculating model is dispatched. The transmission rate during dispatching may be determined by the number of bytes occupied by the data or the model during storage, that is, the smaller the number of bytes occupied by the data or the model during storage, the smaller the bit width occupied during transmission, and the higher the transmission rate, the lower the dispatching cost. The larger the number of bytes occupied by the data or the model during storage, the more the bit width occupied during transmission, the lower the transmission rate, and the higher the dispatching cost.

Corresponding to the judgment result that the dispatching cost of the data collection is less than the dispatching cost of the calculating model, the process jumps to 305; corresponding to the judgment result that the dispatching cost of the data collection is greater than the dispatching cost of the calculating model, the process jumps to 306.

In 305, the dispatching execution unit 122B transmits the execution plan to the first node device where the data collection is located, and performs data calculation from the second node device to the first node device to return the query result. In embodiments, as shown in FIG. 2A or 2B, the first node device can be a device that stores data node 130 or data node 130A or data node 130B, and each data node is configured to store different data collections. The second node device can be a device that stores model node 131 or model node 131A or model node 131B, and each model node is configured to store different calculating models. For example, in step 304, the dispatching judgment unit 122A determines that the data collection and the calculating model corresponding to the execution plan may be the data collection stored in the data node 130A and the calculating model stored in the model node 131A.

In embodiments, as shown in FIG. 2A, when the corresponding dispatching judgment unit 122A judges that the dispatching cost of the data collection is greater than the dispatching cost of the calculating model, for example, if the size of the storage space occupied when the data collection is stored is 100 megabytes, the bytes occupied by the data collection can be 104857600 bytes. If the storage space occupied when the calculating model is stored is 50 megabytes, the bytes occupied when the calculating model is stored can be 52428800 bytes. That is, the number of bytes occupied by the data collection during storage is greater than the number of bytes occupied by the calculating model during storage. It will be understood that the transmission rate of the data collection is lower than the transmission rate of the calculating model.

Further, the dispatching execution unit 122B transmits the execution plan to the data node in which the data collection is located, initiates a dispatching request to the model node in which the calculating model is located, dispatches the calculating model to the data node for data calculation, and sequentially returns the result calculated at the data node to the client 100 from the dispatching coordinator 122 and the proxy 110 as a query result. Compared with the data collection in which the dispatching transmission rate is lower, the calculating model in which the dispatching transmission rate is higher can effectively improve the transmission rate during dispatching. Meanwhile, when the corresponding query task request includes a plurality of sub-query tasks, the calculating model with a smaller number of bytes occupied by dispatching storage can decrease the bit width occupied by network transmission during dispatching, ensure the dispatching query efficiency of other sub-query tasks, and improve the data query efficiency.

In 306, the dispatching execution unit 122B transmits the execution plan to the second node device in which the calculating model is located, and performs data calculation from the first node device to the second node device to return the query result. In embodiments, as shown in FIG. 2B, when the corresponding dispatching judgment unit 122A judges that the dispatching cost of the data collection can be less than the dispatching cost of the calculating model. For example, if the size of the storage space occupied when the calculating model is stored is 100 megabytes, the bytes occupied when the calculating model is stored can be 104857600 bytes. If the size of the storage space occupied when the data collection is stored is 50 megabytes, the bytes occupied when the data collection is stored can be 52428800 bytes. That is, the number of bytes occupied when the data collection is stored is less than the number of bytes occupied when the calculating model is stored. It will be understood that the transmission rate of the data collection is higher than the transmission rate of the calculating model.

Further, the dispatching execution unit 122B transmits the execution plan to the model node in which the calculating model is located, initiates a dispatching request to the data node in which the data collection is located, dispatches the data collection to the model node for data calculation, and returns the result calculated at the model node as a query result to the client 100 from the dispatching coordinator 122 and the proxy 110 in sequence. Compared with the calculating model in which the dispatching transmission rate is lower, the data collection in which the dispatching transmission rate is higher can effectively improve the transmission rate during dispatching. Meanwhile, when the corresponding query task request includes a plurality of sub-query tasks, the data collection with a smaller number of bytes occupied by dispatching storage can decrease the bit width occupied by network transmission during dispatching, ensure dispatching query efficiency of other sub-query tasks, and improve data query efficiency.

It will be understood that a plurality of query results can be obtained for different types of data collections. For example, as shown in FIG. 4, the node 42A10 and the node 42A20 can be configured as two sub-query results. When the plurality of sub-query results are returned to the client 100, the plurality of sub-query results can be returned to the proxy 110. After the proxy 110 aggregates the sub-query results, the total query result of the query task request can be obtained. For example, the total query result of the node 42AN can be obtained after the two sub-query results of the node 42A10 and the node 42A20 are aggregated, and the total query result can be returned to the user, for example, transmitted to the client 100.

According to the data query method provided in the embodiment of the present disclosure, after the data collection and the calculating model corresponding to the received query task request are determined, the transmission rate of the data collection or the calculating model is determined by the number of bytes occupied when the data collection or the calculating model is stored or the number of bit widths occupied when the data collection or the calculating model is transmitted. The query task request is transmitted to the model or the data node whose transmission rate is lower, and the data or the model node whose transmission rate is higher is dispatched to perform data calculation. Thus, the network bit width occupied when the data or the model is invoked in the data query can be decreased, the number of data or models invoked in the same time period or at the same time can be increased, and the transmission rate of each data or model when the data or the model is dispatched is also increased, thereby improving the data query efficiency.

Further, when the query task request includes a plurality of sub-query requests, the data collection corresponding to each sub-query request and the calculating model are judged by the data query method. Then, each sub-query request is transmitted to a model or a data node whose transmission rate is lower, and the data or the model node whose transmission rate is higher is dispatched to perform data calculation so that the network transmission rate when the data or the model is invoked can be improved. At the same time, since each sub-query request determines the corresponding data collection and the transmission rate of the calculating model respectively, the node of the data calculation corresponding to each sub-query request is determined as a model or a data node whose transmission rate is lower. That is, all the nodes of the data calculation of each sub-query request are determined as the nodes in which the model or the data are located, thereby decreasing the power consumption of the node equipment in which the data or the model is located, such as the data node 130 or the model node 131 in FIG. 2A, when performing the data calculation, and improving the query efficiency of the database system.

It will be understood that each of the sub-query requests originally placed on the data node 130 or the model node 131 for data calculation is dispersed to the data node 130 and the model node 131 based on the data query method, thereby decreasing power consumption of the data node 130 and the model node 131 in performing data calculation, improving data processing efficiency of the data node 130 or the model node 131, and further improving data query efficiency.

Figure 5:
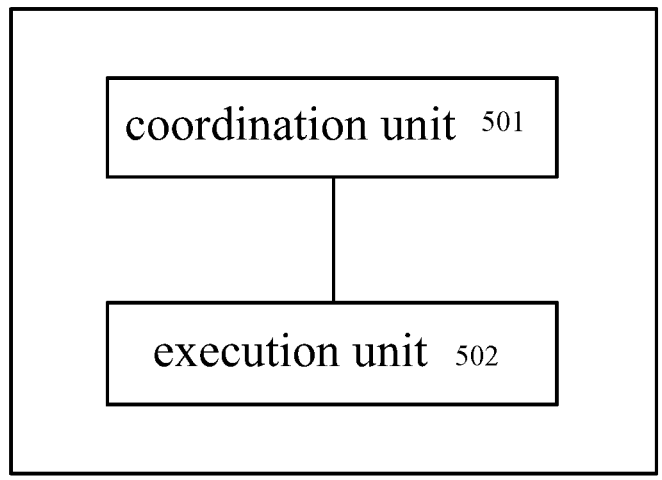
FIG. 5 illustrates a schematic structural diagram of a database apparatus 500 according to some embodiments of the present disclosure.

Further, an embodiment of the present disclosure provides a database apparatus 500. For example, as shown in FIG. 5, the database apparatus 500 includes at least a coordination unit 501 and an execution unit 502. While FIG. 5 illustrates various components contained in the database apparatus 500, FIG. 5 illustrates one example of a database apparatus of the present disclosure, and additional components can be added and existing components can be removed.

The coordination unit 501 is configured to parse the received query task request, perform logical analysis on the host language corresponding to the query task request, extract execution logic of an execution event corresponding to the host language, generate a logical plan of a tree topology structure from the execution logic, convert the logical plan compilation of the host language into an execution plan to be compiled and converted into a binary executable file, determine a data collection and a calculating model according to the execution plan, and determine the dispatching costs of the data collection and the calculating model. In embodiments, for the function of the coordination unit 501 and a method for implementing the function, reference can be made to the related description of the parsing coordinator 120, the compilation coordinator 121, and the dispatching judgment unit 122A, such as the related description and description of the steps 302, 303, and 304, as described above.

The execution unit 502 is configured to determine the dispatching costs of the data collection and the calculating model, and transmit the execution plan to the first node device where the data collection is located based on the result of the determination, and transmit the execution plan from the second node device to the first node device to perform data calculation and return the query result, or transmit the execution plan to the second node device where the calculating model is located, and transmit the execution plan from the first node device to the second node device to perform data calculation and return the query result. In embodiments, for the execution unit 502 and the method for implementing, the function can be described with reference to the related description of the foregoing dispatching execution unit 122B, such as the related description and description of the foregoing steps 305 and 306, as described above.

According to the database apparatus 500 provided in the embodiment of the present disclosure, after determining the data collection and the calculating model corresponding to the received query task request, the data collection or the transmission rate of the calculating model is judged by the number of bytes occupied when the data collection or the calculating model is stored or the number of bit widths occupied when the data collection or the calculating model is transmitted. The query task request is transmitted to a model or a data node with a lower transmission rate, and the data or the model node with a higher transmission rate is dispatched to perform data calculation, so that the network transmission rate during dispatching is improved, and the data query efficiency is improved.

Figure 6:
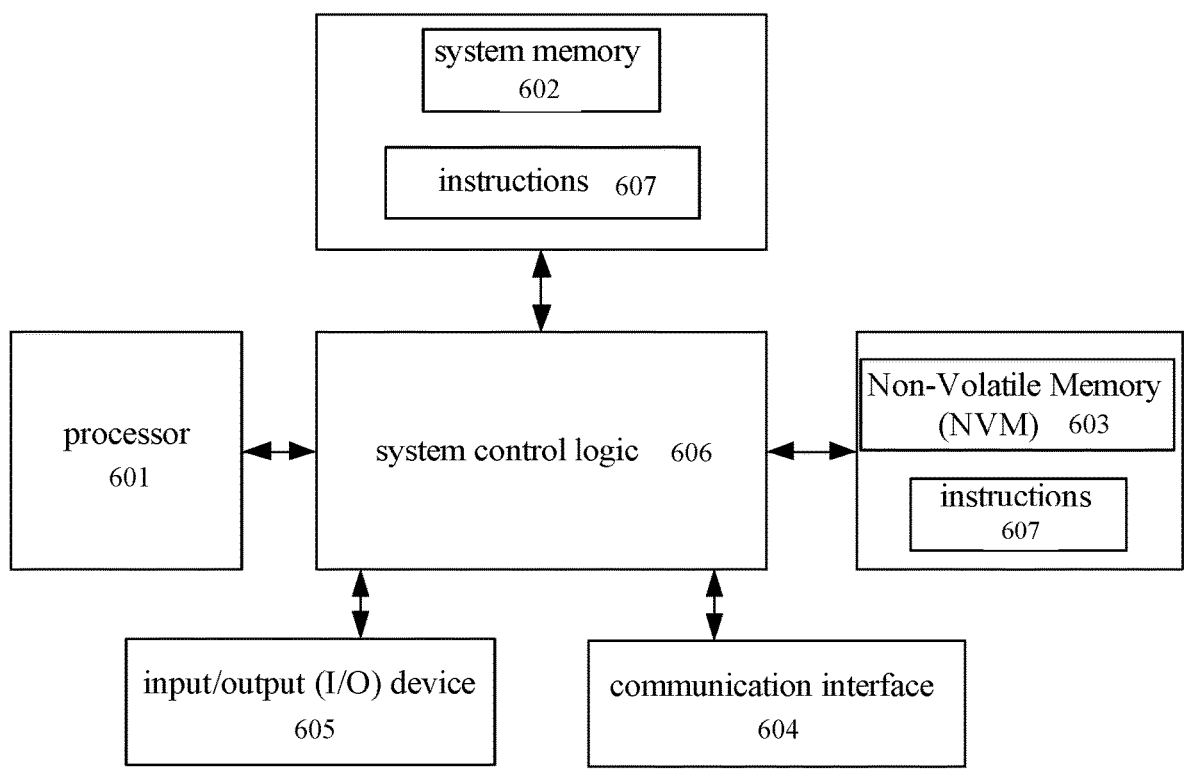
FIG. 6 illustrates a schematic structural diagram of an electronic device 600 according to some embodiments of the present disclosure.

Further, FIG. 6 illustrates a schematic structural diagram of an electronic device 600 according to embodiments of the present disclosure. While FIG. 6 illustrates various components contained in the electronic device 600, FIG. 6 illustrates one example of a electronic device of the present disclosure, and additional components can be added and existing components can be removed.

The electronic device 600 can be an electronic device running a node/module in the database system 10/20, and/or can be the aforementioned client 100. As shown in FIG. 6, the electronic device 600 may include one or more processors 601, system memory 602, Non-Volatile Memory (NVM) 603, communication interface 604, input/output (I/O) device 605, and system control logic 606 for coupling the processor 601, the system memory 602, the Non-Volatile Memory 603, the communication interface 604, and the I/O device 605.

The processor 601 may include one or more single-core or multi-core processors. In some embodiments, the processor 601 may include any combination of a general purpose processor and a special purpose processor (e.g., graphics processor, application processor, baseband processor, etc.). In some embodiments, the processor 601 may execute instructions corresponding to the data query methods provided in the foregoing embodiments.

The system memory 602 is a volatile memory such as Random-Access Memory (RAM), Double Data Rate Synchronous Dynamic Random Access Memory (DDR SDRAM), etc. The system memory is configured to temporarily store data and/or instructions. For example, in embodiments, the system memory 602 may be configured to temporarily store instructions of the data query method provided in the foregoing embodiments, may be configured to store data collections, temporary copies of calculating models, may be configured to temporarily store query results of query task requests, etc.

Non-volatile memory 603 may include one or more tangible, non-transitory computer-readable media for storing data and/or instructions. In embodiments, the non-volatile memory 103 may include any suitable non-volatile memory, such as flash memory, and/or any suitable non-volatile storage device, such as a Hard Disk Drive (HDD), Compact Disc (CD), Digital Versatile Disc (DVD), Solid-State Drive (SSD), etc. Non-volatile memory 603 may also be a removable storage medium, such as a Secure Digital (SD) memory card. In embodiments, non-volatile memory 603 can be configured to store instructions of the data query method provided in the foregoing embodiments, or may permanently store the foregoing data collections, calculating models, etc.

The system memory 602 and non-volatile memory 603 can include temporary and permanent copies of the instructions 607, respectively. The instructions 607 can include causing, when executed by at least one of the processors 601, the electronic device 600 to implement the data query methods provided in various embodiments of the present disclosure.

The communication interface 604 can include a transceiver for providing a wired or wireless communication interface for electronic device 600 to communicate with any other suitable device over one or more networks. In embodiments, the communication interface 604 can be integrated with other components of the electronic device 600, e.g., the communication interface 104 may be integrated in the processor 601. In embodiments, the electronic device 600 can communicate with other devices through communication interface 604. For example, the database system 10 of the communication interface 604 communicates (e.g., transmits a query task request, transmits a query result, etc.) between the nodes/modules of different electronic devices, and communicates with the client 100 (e.g., receives a query task request, and returns a query result corresponding to the query task request, etc.).

The input/output (I/O) device 605 can include a user interface to enable a user to interact with electronic device 600. For example, in embodiments, input/output (I/O) device 605 can include an output device such as a display. The system control logic 606 can include any suitable interface controller to provide any suitable interface with other modules of the electronic device 600. For example, in embodiments, system control logic 606 can include one or more memory controllers to provide an interface to system memory 602 and non-volatile memory 603.

In embodiments, at least one of the processors 601 can be packaged together with logic for one or more controllers of the system control logic 606 to form System in Package (SiP). In embodiments, at least one of the processors 601 can also be integrated on the same chip as logic for one or more controllers of the system control logic 606 to form a System-on-Chip (SoC).

It will be understood that the electronic device 600 can be any electronic device including, but not limited to, a tablet computer, a desktop computer, a server/server cluster, a laptop computer, a handheld computer, a notebook computer, a desktop computer, a ultra-mobile personal computer (UMPC), a netbook, a mobile phone, a cellular phone, a personal digital assistant (PDA), an augmented reality (AR) device, a virtual reality (VR) device, a media player, a smart television, a smart speaker, a smart watch, etc., and the embodiments of the present disclosure are not limited.

It will be understood that the structure of the electronic device 600 shown in the embodiments of the present disclosure does not constitute a specific limitation on the electronic device 100. In other embodiments of the present disclosure, the electronic device 600 can include more or fewer components than illustrated, or may combine certain components, or may split certain components, or may have different component arrangements. The illustrated components may be implemented in hardware, software, or a combination of software and hardware.

Embodiments of the mechanisms disclosed herein may be implemented in hardware, software, firmware, or a combination of these implementations. Embodiments of the present disclosure may be implemented as a computer program or program code executing on a programmable system including at least one processor, a storage system (including volatile and non-volatile memory and/or storage elements), at least one input device, and at least one output device.

In some cases, the disclosed embodiments may be implemented in hardware, firmware, software, or any combination thereof. The disclosed embodiments may also be implemented as instructions carried by or stored on one or more temporary or non-temporary machine-readable (e.g., computer-readable) storage media, which may be read and executed by one or more processors. For example, the instructions may be distributed through a network or through other computer-readable media. Thus, a machine-readable medium may include any mechanism for storing or transmitting information in a form readable by a machine (e.g., a computer), including, but not limited to, a floppy disk, an optical disk, an optical disk, a read-only memory (CD-ROMs), a magneto-optical disk, a read-only memory (ROM), a random access memory (RAM), an erasable programmable read-only memory (EPROM), an electrically erasable programmable read-only memory (EEPROM), a magnetic or optical card, a flash memory, or a tangible machine-readable memory for transmitting information (e.g., a carrier wave, an infrared signal digital signal, etc.) in an electrical, optical, acoustic, or other form of propagated signal using the Internet. Thus, a machine-readable medium includes any type of machine-readable medium suitable for storing or transmitting electronic instructions or information in a form readable by a machine (e.g., a computer).

In the drawings, some structural or methodological features may be shown in a particular arrangement and/or sequence. However, it should be understood that such a particular arrangement and/or ordering may not be required. Rather, in some embodiments, these features may be arranged in a manner and/or sequence different from that shown in the illustrative drawings. In addition, the inclusion of structural or methodical features in a particular figure is not meant to imply that such features are required in all embodiments, and that such features may not be included or may be combined with other features in some embodiments.

It should be noted that each unit/module mentioned in each device embodiment of the present disclosure is a logical unit/module. Physically, a logical unit/module may be a physical unit/module, may be a part of a physical unit/module, or may be implemented in a combination of a plurality of physical units/modules. The physical implementation of these logical units/modules is not most important. The combination of functions implemented by these logical units/modules is the key to solving the technical problem proposed in the present disclosure. Furthermore, in order to highlight the inventive part of the present disclosure, the above-mentioned device embodiments of the present disclosure do not introduce units/modules which are not closely related to solving the technical problems set forth in the present disclosure, which does not indicate that the above-mentioned device embodiments do not have other units/modules.

It should be noted that in the examples and descriptions of this patent, relational terms such as first and second, etc., are used solely to distinguish one entity or operation from another entity or operation without necessarily requiring or implying any such actual relationship or order between such entities or operations. Moreover, the terms "comprises," "comprising," or any other variation thereof, are intended to cover a non-exclusive inclusion, such that a process, method, article, or apparatus that comprises a list of elements does not include only those elements but also other elements not expressly listed or that are inherent to such process, method, article, or apparatus. Without further limitation, the element defined by the word "comprising" does not exclude the presence of additional identical elements in the process, method, article, or apparatus that comprises the element.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which can be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that can include: A alone; A and B; A, B and C; A, B, C, and D; and so forth. The bounds of an "and/or" list are defined by the complete set of combinations and permutations for the list.

While the present disclosure has been illustrated and described with reference to certain preferred embodiments thereof, it will be understood by those of ordinary skill in the art that various changes may be made in form and detail without departing from the scope of the disclosure.

The invention claimed is:

1. An apparatus applied to a database system, comprising:
 a storage device configured to store one or more data collections and one or more calculating models, wherein the one or more data collections are stored in a first node device in the storage device and the one or more calculating models are stored in a second node device in the storage device, the calculating models are used to perform data calculations on the data collection, data within the data collections are vector data, the data calculations includes weight scoring and filtering; and
 a processor configured to:
  receive a query task request, and parse the query task request to obtain a computer executable file, wherein a query task corresponding to the query task request is for retrieving related or similar query result of user's query data;
  determine a data collection from the one or more data collections and a calculating model from the one or more calculating models corresponding to the query task request based on the computer executable file;
  determine a dispatching condition of the query task request, and perform dispatching of the data collection or the calculating model according to the dispatching condition, which includes:
   dispatching, when the number of bytes utilized when the data collection is stored being less than the number of bytes utilized when the calculating model is stored, or the bit width utilized when the data collection to be dispatched for transmission being less than the bit width utilized when the calculating model is dispatched for transmission, the data collection from the first node device to the second node device for the second node device to execute the computer executable file and return a sub-query result; or
   dispatching, when the number of bytes utilized when the data collection is stored being greater than the number of bytes utilized when the calculating model is stored, or the bit width utilized when the data collection to be dispatched for transmission being greater than the bit width utilized when the calculating model is dispatched for transmission, the calculating model from the second node device to the first node device for the first node device to execute the computer executable file and return a sub-query result; and
  aggregate the sub-query result to obtain the query result of the query task request.

2. The apparatus as claimed in claim 1, wherein parsing the query task request to obtain a computer executable file comprises:
 parsing the query task request to generate a parsed result;
 constructing a topology diagram according to the parsed result; wherein the topology diagram is configured to indicate execution logic of the query task request;
 generating a computer executable file based on the execution logic; and
 returning the sub-query result after executing the query task based on the computer executable file.

3. The apparatus as claimed in claim 2, wherein parsing the query task request and constructing the topology diagram according to the parsed result comprises:
 obtaining a host language of the query task request, wherein the host language is configured to represent a computer language for writing query codes comprising the query task request;
 parsing the query codes to obtain a plurality of logical nodes and an association of each of the plurality of logical nodes, wherein the association is configured to represent the exchange of data for each of the logical nodes; and
 connecting each of the plurality of logical nodes based on the association to obtain the topology diagram.

4. The apparatus as claimed in claim 3, wherein the computer language comprises at least one of C, C++, Java, Scala, Python, Perl, Go, R and Lisp.

5. The apparatus as claimed in claim 2, wherein the topology diagram comprises a directed acyclic graph.

6. The apparatus as claimed in claim 2, wherein the computer executable file comprises a binary executable file.

7. A method executed by at least one processor, applied to a database system, comprising:
 receiving a query task request, and parse the query task request to obtain a computer executable file, wherein the query task corresponding to the query task request is for retrieving related or similar query result of user's query data;

determining a data collection and a calculating model corresponding to the query task request, the calculating model is used to perform data calculations on the data collection, the data within the data collections are vector data; and determining a dispatching condition of the query task request, and perform dispatching of the data collection or the calculating model according to the dispatching condition, which includes:

dispatching, when the number of bytes utilized when the data collection is stored being less than the number of bytes utilized when the calculating model is stored, or the bit width utilized when the data collection to be dispatched for transmission being less than the bit width utilized when the calculating model is dispatched for transmission, the data collection from the first node device to the second node device for the second node device to execute the computer executable file and return a sub-query result; or dispatching, when the number of bytes utilized when the data collection is stored being greater than the number of bytes utilized when the calculating model is stored, or the bit width utilized when the data collection to be dispatched for transmission being greater than the bit width utilized when the calculating model is dispatched for transmission, the calculating model from the second node device to the first node device for the first node device to execute the computer executable file and return a sub-query result; and aggregate the sub-query result to obtain the query result of the query task request.

8. The method as claimed in claim 7, wherein parsing the query task request to obtain a computer executable file comprises:

parsing the query task request to generate a parsed result;

constructing a topology diagram according to the parsed result; wherein the topology diagram is configured to indicate execution logic of the query task request;

generating a computer executable file based on the execution logic; and returning the sub-query result after executing the query task based on the computer executable file.

9. The method as claimed in claim 8, wherein parsing the query task request and constructing the topology diagram according to the parsed result comprises:

obtaining a host language of the query task request, wherein the host language is configured to represent a computer language for writing query codes comprising the query task request;

parsing the query codes to obtain a plurality of logical nodes and an association of each of the plurality of logical nodes, wherein the association is configured to represent the exchange of data for each of the logical nodes; and connecting each of the plurality of logical nodes based on the association to obtain the topology diagram.

10. A non-transitory computer-readable storage medium storing instructions that, when executed, cause an electronic device to perform a method comprising:

receiving a query task request, and parse the query task request to obtain a computer executable file, wherein the query task corresponding to the query task request is for retrieving related or similar query result of user's query data;

determining a data collection and a calculating model corresponding to the query task request, the calculating model is used to perform data calculations on the data collection, the data within the data collections are vector data;

determining a dispatching condition of the query task request, and perform dispatching of the data collection or the calculating model according to the dispatching condition, which includes:

dispatching, when the number of bytes utilized when the data collection is stored being less than the number of bytes utilized when the calculating model is stored, or the bit width utilized when the data collection to be dispatched for transmission being less than the bit width utilized when the calculating model is dispatched for transmission, the data collection from the first node device to the second node device for the second node device to execute the computer executable file and return a sub-query result; or dispatching, when the number of bytes utilized when the data collection is stored being greater than the number of bytes utilized when the calculating model is stored, or the bit width utilized when the data collection to be dispatched for transmission being greater than the bit width utilized when the calculating model is dispatched for transmission, the calculating model from the second node device to the first node device for the first node device to execute the computer executable file and return a sub-query result; and aggregate the sub-query result to obtain the query result of the query task request.

11. The computer-readable storage medium as claimed in claim 10, wherein parsing the query task request to obtain a computer executable file comprises:

parsing the query task request to generate a parsed result;

constructing a topology diagram according to the parsed result; wherein the topology diagram is configured to indicate execution logic of the query task request;

generating a computer executable file based on the execution logic; and returning the sub-query result after executing the query task based on the computer executable file.

12. The computer-readable storage medium as claimed in claim 11, wherein parsing the query task request and constructing the topology diagram according to the parsed result comprises:

obtaining a host language of the query task request, wherein the host language is configured to represent a computer language for writing query codes comprising the query task request;

parsing the query codes to obtain a plurality of logical nodes and an association of each of the plurality of logical nodes, wherein the association is configured to represent the exchange of data for each of the logical nodes; and connecting each of the plurality of logical nodes based on the association to obtain the topology diagram.

* * * * *